United States Patent [19]

Haus, Jr.

[11] Patent Number: 4,599,032
[45] Date of Patent: Jul. 8, 1986

[54] ROLLING BASE FOR TRUCK CRANES

[75] Inventor: John C. Haus, Jr., Lancaster, Pa.

[73] Assignee: U.S. Truck Cranes, Inc., York, Pa.

[21] Appl. No.: 714,909

[22] Filed: Mar. 22, 1985

[51] Int. Cl.⁴ .................................................. B60P 1/54
[52] U.S. Cl. ...................... 414/542; 104/235;
104/236; 105/29 R; 180/7.1; 212/205; 267/63 R; 267/153; 295/44; 414/549; 414/561
[58] Field of Search ............... 104/248, 236, 165, 235; 105/29 R; 295/44; 267/63 R, 153; 414/140, 542, 541, 549, 561, 560, 139; 212/205; 180/7.1

[56] References Cited

U.S. PATENT DOCUMENTS

| | | | |
|---|---|---|---|
| 1,463,196 | 7/1923 | Cochran | 295/44 |
| 3,188,977 | 6/1965 | Viktorsson | 104/235 |
| 3,301,416 | 1/1967 | Bopp | 105/29 R X |
| 3,371,891 | 3/1968 | Brader, Sr. et al. | 414/140 X |
| 3,547,284 | 12/1970 | Dunbar | 104/248 |
| 3,730,509 | 5/1973 | Jorn | 267/63 R X |
| 3,920,231 | 11/1975 | Harrison et al. | 267/63 R X |

FOREIGN PATENT DOCUMENTS

| | | | |
|---|---|---|---|
| 23104 | 3/1981 | Japan | 414/749 |
| 1556531 | 11/1979 | United Kingdom | 414/487 |

Primary Examiner—Frank E. Werner
Attorney, Agent, or Firm—Daniel J. O'Connor

[57] ABSTRACT

A rolling base assembly for truck cranes which allows movement of the truck crane under load-carrying conditions. The device comprises a fixed chain installed along the centerline of a flatbed trailer. A rolling base, having outboard roller housing assemblies, is caused to crawl along the fixed chain by means of motor driven sprocket devices attached to the rolling base. The roller housing assemblies are designed to move along the standard I-beam construction of a flatbed truck.

4 Claims, 3 Drawing Figures

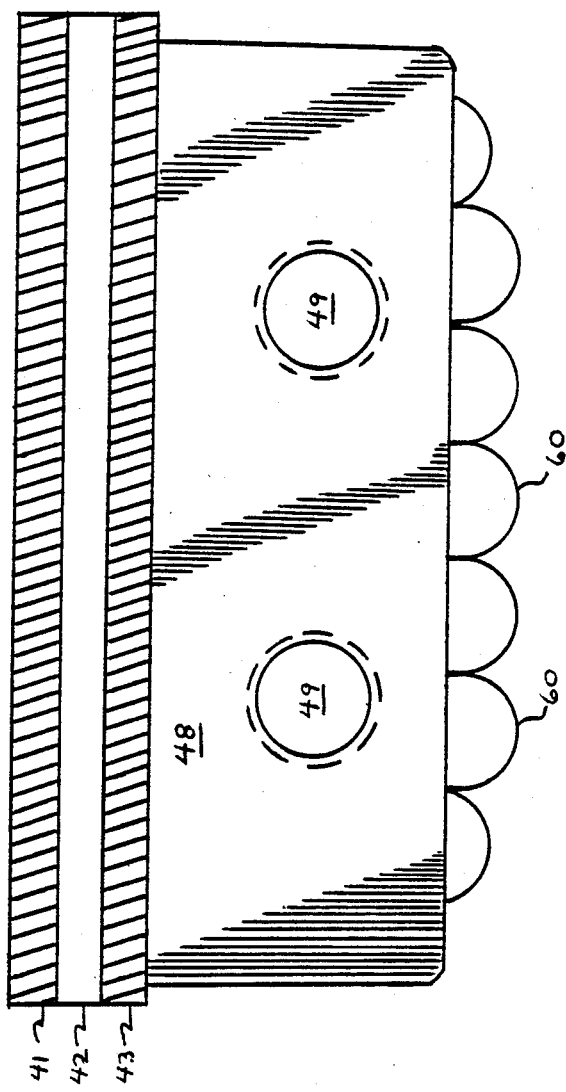

ROLLING BASE FOR TRUCK CRANES

BACKGROUND OF THE INVENTION

It has been known for some thirty years that permanently mounted truck cranes would be advantageous and economically feasible for the rapid and safe unloading of flatbed trucks. The need for such permanently mounted truck cranes increased as truck load bearing capabilities went upward and as the standard flatbed truck length approached forty feet.

Some of the early truck cranes were essentially a self-powered cart on wheels. The wheels of such carts were placed in specially designed slots in the truck bed, the slots being at or near one or more I-beams which run the length of a standard flatbed truck.

Prior U.S. patents which illustrate the state of the art in this technology are U.S. Pat. Nos. 3,501,031; 3,082,889; and 3,093,248.

The prior art truck cranes were of course a vast improvement over preceeding unloading methods which required much time and mechanical labor to put machinery in place for unloading a large flatbed truck.

However, prior art truck cranes which roll along the bed of the truck have historically suffered at least one serious drawback, i.e. they could not move along the bed of the truck while simultaneously carrying a load. Thus, in practice, the crane would be rolled into position by means of its own motor unit, the load would be lifted, and then the crane boom would be extended as far as safely possible. The load would then be lowered and released, the boom retracted, and the crane would be rolled into position to again pick up the load and move it still further down the length of the flatbed truck. This "inch-worm" process continued until the loads were in the desired position to be lifted one last time by the truck crane and swung off the truck.

It is again emphasized that this complex process was required since the rolling truck crane bases of the prior art, utilizing by necessity a relatively low-power engine, were not and are not capable of moving under load conditions. Once the load is picked up, they are simply not able to overcome the roller friction forces resulting from a heavy load. Thus, the "inch-worm" process referred to above has become a standard unloading practice in the industry over the past 18 years.

Such process is not only time consuming but poses increased danger to the operator and the load itself since, each time a load is picked up and put down again, a risk of damage or injury from load tipping or operator error is possible.

From the foregoing, it is apparent that a rolling base truck crane which is capable of moving under full load conditions would be of highly significant advantage in the art.

OBJECTS OF THE INVENTION

It is accordingly an object of the present invention to provide a rolling base truck crane assembly which will reliably and safely roll along the bed of a truck while carrying a load.

For space requirements, it is also an object of this invention to accomplish the above rolling load condition by means of a relatively low-power motor.

It is a further object of the present invention to provide a rolling base truck crane assembly which can be easily adapted to existing flatbed trucks so that trucks presently in use may take advantage of this major improvement in the state of the art.

It is a further object of the present invention to provide that the rolling load function be accomplished with a minimal danger of load tipping which may inherently result in operator injury and load or truck damage.

BRIEF DESCRIPTION OF THE INVENTION

The present invention uses a fixed chain arrangement. The fixed chain runs the length of the truck bed and is positioned in a slot of the wooden deck of the bed. The rolling crane base is designed to crawl along the length of the chain since it is attached to the chain via drive and idler sprockets. The drive sprocket is turned by means of a relatively low-power hydraulic motor to provide the crawling action along the fixed position chain.

Along each side of the chain are positioned roller housing assemblies. The roller housing assemblies are attached to the crane base by means of weldments. The roller housing assemblies contain in a central area thereof equipment skids or needle rollers which are commercially available but specifically shaped and adapted to the design of the present invention.

The roller housing assemblies have outer arms which depend downwardly and inwardly in a manner to cooperate with I-beams which are a part of the flatbed truck structure. The inwardly extending portions of the outer arms have low friction wear pads on the tops thereof to contact one side of the I-beam structure. The other side of the I-beam structure is contacted by the equipment skids or needle rollers.

The roller housing assemblies, central chain and hydraulic motor drive components have further detailed advantageous constructions which will be more fully described hereinbelow.

The overall effect of the invention is to provide a system which will effectively move a load carrying truck mounted crane assembly with efficiency and safety. The invention components are also relatively more easily manufactured compared to prior art devices which have been overly complex while not accomplishing fully the desired task of rolling a crane while it carries a load. The component design is also readily installed into an existing truck trailer.

BRIEF DESCRIPTION OF THE DRAWINGS

FIG. 2 also shows the fixed chain assembly in its central position and in relation to the trailer wooden deck.

FIG. 3 is a cut-away view along line 3—3 of FIG. 2 showing the relation between the needle rollers and portions of the roller housing assembly and the central roller support elements.

DETAILED DESCRIPTION OF THE INVENTION

Figure 1:
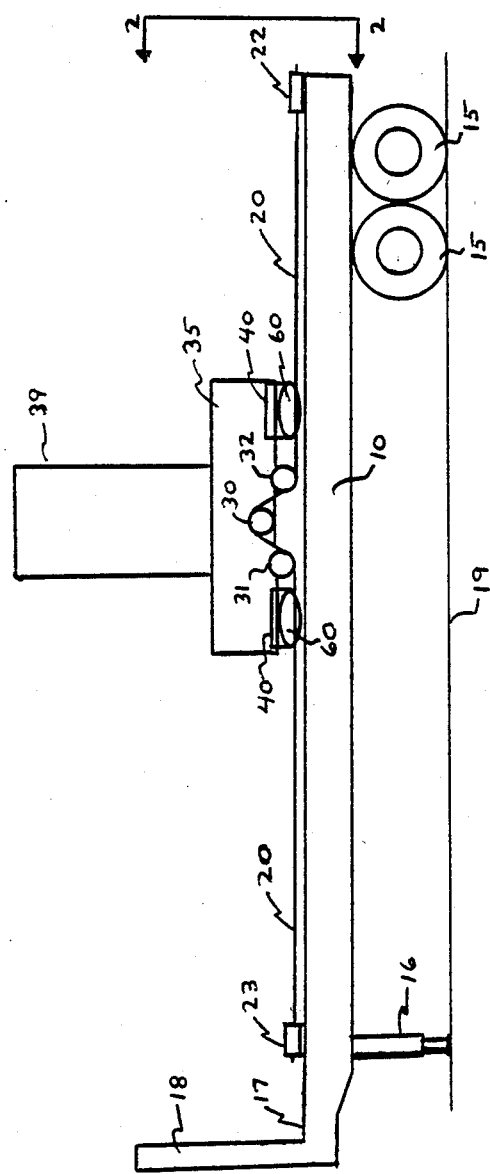
FIG. 1 is a side schematic general arrangement view of the rolling base truck crane assembly of the present invention. In this view, the wooden deck members of the flatbed trailer have been removed to show the fixed chain assembly running nearly the full length of the trailer and its relationship with drive and sprocket gearing. Also shown in schematic form are the housings and needle roller assemblies therein.

Referring now to the drawings in which like parts have been shown with the same numerals, in FIG. 1 a flatbed trailer 10 is shown resting on level ground 19 by means of rear wheels 15 and front trailer support 16. Numeral 17 shows the forward portion of the trailer while numeral 18 shows the forward vertical wall of a standard flatbed trailer.

Figure 2:
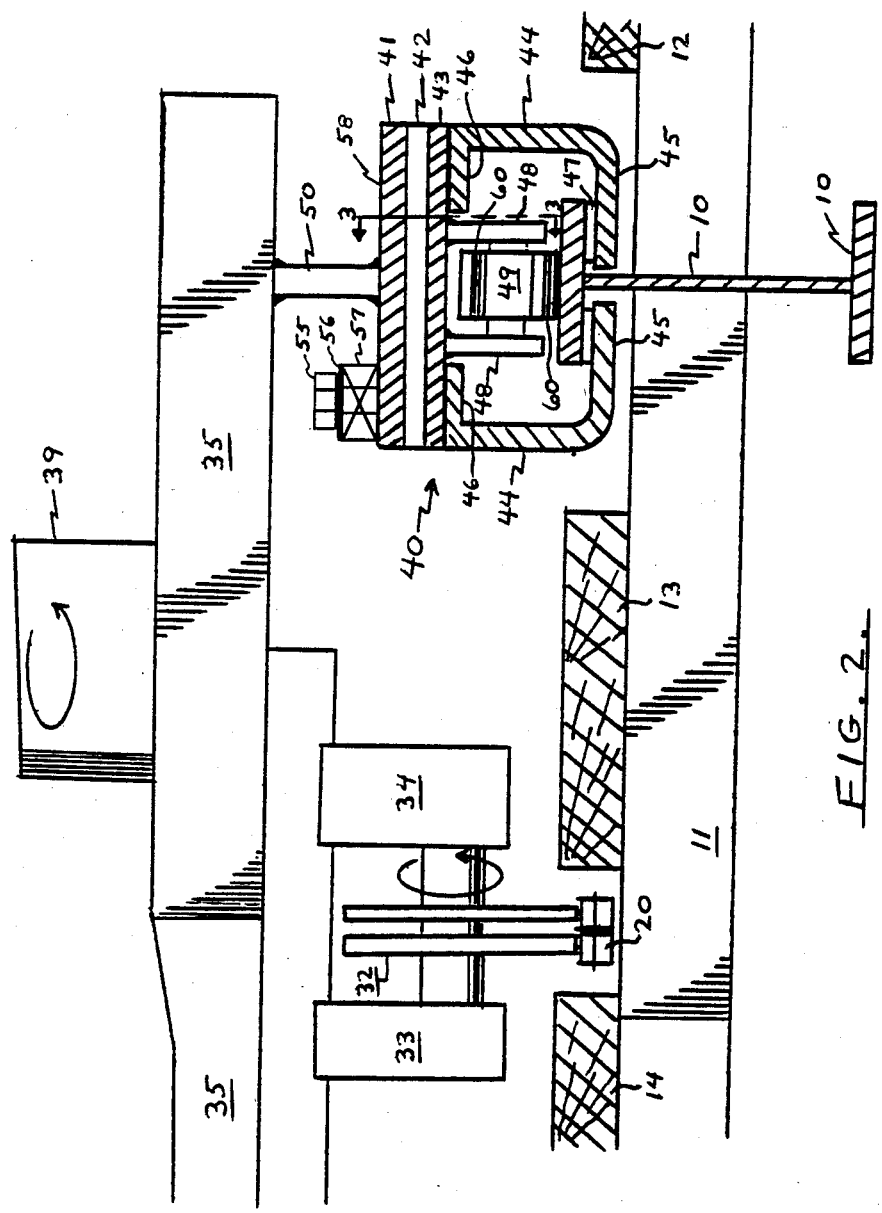
FIG. 2 is an end elevational view along line 2—2 of FIG. 1, partly in cross section, showing from the rear portion of a flatbed trailer the roller housing assembly construction as it interconnects with the truck crane base and the trailer I-beam structure.

Shown running along nearly the entire length of the trailer of FIG. 1 is a fixed chain assembly 20. The chain is attached to threaded adjustment members known in the art as indicated at 22 and 23 to provide means for installation and adjusting chain tension when required. It should be noted that the trailer wooden deck shown at numerals 12, 13 and 14 of FIG. 2 has been removed in FIG. 1 to show the fixed chain assembly running almost the entire length of the flatbed trailer. As shown in FIG. 2, the chain 20 will normally be permanently located at the centerline of the trailer in a slot formed in the wooden deck of the trailer as described more fully below.

Referring again to FIG. 1, it can be seen that chain 20 is connected with a drive sprocket 30 and idler sprockets indicated at 31 and 32. The drive and idler sprockets are appropriately mounted to the rolling crane base 35. The drive sprocket 30 is turned by a relatively low power hydraulic motor mounted as a part of the rolling base assembly 35.

The crane itself is shown in schematic form at numeral 39 of FIG. 1 and would comprise rotatable and extensible boom elements known in the art and not part of the present invention. It is contemplated that the overall device would be remotely controlled by an operator using a pneumatic remote control system previously patented by the assignee of the present invention.

Also shown in schematic form in FIG. 1 are needle rollers 60 having roller housing assemblies 40 which will be more fully described with reference to FIG. 2.

From the showing in FIG. 1, it can be seen that the rolling crane base 35, by action of the motor driven drive sprocket 30, is caused to crawl along the length of fixed chain 20. The weight of the rolling base 35 is supported by needle rollers 60 and the roller housing assemblies 40. It has been found from experimentation that such a drive and rolling support arrangement allows the rolling base 35 and crane 39 to move along the length of the trailer bed under load conditions, that is, when the crane is carrying a full load. Such result is in marked contrast to other systems presently in use in which the crane and base cannot move under load conditions but rather are required to pick up and move a load down the length of a trailer in "inch-worm" fashion referred to previously.

It has also been found that the present system which will be more fully described is capable of moving a load upwardly against a five degree grade and of swinging a full load out over the sides of a trailer bed without the danger of tipping. Such benefits of the present system will be recognized by those skilled in the art as highly advantageous to the truck crane technology.

Referring now to FIG. 2, showing a partial end view along lines 2—2 of FIG. 1, there are depicted a standard trailer cross member 11 and standard wooden trailer deck sections 12, 13 and 14. Chain 20 is shown lying in a slot formed between wooden deck elements 13 and 14. In practice of the invention, the trailer bed would be modified by cutting this slot so that chain 20 would rest therein and become a permanent part of the trailer structure.

The chain 20 lies at the center-line of the trailer bed and would be fixedly attached to adjustable end elements 22 and 23 as referred to in FIG. 1.

Also shown in FIG. 2 is idler sprocket 32 which, in cooperation with the drive sprocket 30 (FIG. 1), causes the rolling base to crawl along the length of the chain 20. Idler sprocket 32 is suitably supported by elements 33 and 34 which are fixedly attached by weldments or other suitable connections to the rolling base assembly 35 which supports the upper crane assembly shown schematically at 39.

Shown in FIG. 2 to the right of chain 20 and wooden deck section 13 is the roller assembly housing 40 having needle roller elements 60 contained in a central portion thereof. It is to be understood that, in practice of the invention, there would be another roller housing assembly to the left of chain 20 in FIG. 2 to provide a balanced rolling action. The other roller housing assemblies used in the invention would of course be identical in structure and operation to that shown at 40 in FIG. 2.

As shown in FIG. 2, housing 40 has three upper layers 41, 42 and 43. Layers 41 and 43 are high strength metal and provide the protective upper cover for the roller housing assembly 40. Sandwiched between layers 41 and 43 is an isolation pad 42 of suitable relatively flexible material. The isolation pad 42 serves to absorb and cushion at least part of the high stress loading inherent on the upper portions of roller housing assembly 40. Isolation pad 43 also provides a small amount of lateral flexing under load conditions when, for example, a load is swung over the side of the flatbed truck. Upper metal layer 41 is attached to the rolling base 35 by means of a welded connector shown at 50 in FIG. 2.

Also a part of the roller housing assembly in FIG. 2 are outer side wall portions 44 having inwardly extending arms at 46 and 45. Arm 46 is secured to layers 41, 42 and 43 by means of a series of spring loaded bolts indicated at 55 of FIG. 2. Each bolt 55 has a flat washer 56 and a compression spring 57 mounted therewith. It is to be understood that such a spring loaded bolt assembly would also be located on the right side of the roller housing assembly at 58 and at other necessary retaining points along the upper portions of the roller housing assembly 40.

The attachment of the roller housing assembly 40 to members 41, 50 and 35 by means of spring loaded bolts 55 provides an inherent advantage to the invention in actual use. It is known, for example, that the I-beams 10 have inherent swell and angular distortions relative to each other. The spring loaded bolt means 55 allows the assembly to yield when such distortions are encountered along the I-beam path and enables the roller assembly to proceed along the I-beam without being damaged or caught up. Thus, while able to yield slightly due to the spring loading, this construction allows the needle rollers and opposing wear pads to bear the weight of a loaded truck crane and still continue movement along the I-beam path.

The lower arm 45 also extends inwardly from outer side wall 44 and has wear pads 47 secured to the upper surface thereof. Wear pads 47 provide means for reducing any frictional engagement which may occur between arm 45 and the upper portion of I-beam 10. For example, under rolling crane load conditions, if the load were swayed to one side by the operator, the entire assembly 40 would tend to lean to one side. Wear pads 47 would serve to reduce the friction damage between the upper I-beam section and arm 45.

Depending downwardly from layer 43 are shown needle roller support arms 48. These arms 48 have connected therebetween a needle roller support cylinder 49 which serves to support the needle roller assembly 60 and allow rotation therearound.

Shown in FIG. 3, which is a view along line 3—3 of FIG. 2, is a side view of a roller support arm 48. As shown, each depending arm 48 has two bores therein so that multiple support cylinders 49 may be inserted. Thus, when the needle rollers 60 are placed in the assembly, they assume a nearly elliptical path around the dual support cylinders 49.

Through testing of the above-described structure, it has been found that the present invention allows a crane base to be moved even under maximum load conditions, and, even more surprisingly, under moving load conditions wherein the load is held over the sides of a truck trailer.

The chain drive of the present invention provides a straight guidance for the crane base and provides sufficient positive traction to permit movement even under load conditions.

The outboard location of the needle roller housing assemblies 40 tends to stabilize loads held over the side of the trailer under either static or rolling conditions. The construction of the roller housing assemblies 40 also allows maximum load lifting capacity by reason of the various stress relievers built into the system.

In the practical use of the invention it is important that no major structural changes need be made to an existing trailer to incorporate the present design. Only small portions of the wooden trailer deck need be notched to accept the drive chain 20. No structural modifications are required to the steel I-beams 10 or the steel cross members 11.

From the foregoing description and the claims appended hereto, the numerous advantages of the present system will be readily apparent to those of skill in the truck crane arts.

I claim:

1. The combination of a truck having a bed and a crane rolling base assembly thereon comprising:

a chain (20) having a first end (23) and a second end (22), said first end being fixedly mounted to the forward end of said truck bed, said second end being fixedly mounted to the aft end of said truck bed, a rolling base (35) for carrying a truck crane (39) being mounted on said truck bed, said rolling base having motor driven sprocket means (30) attached thereto, said chain (20) being attached to said sprocket means at a position between the first and second ends of said chain, said rolling base having roller assemblies (60) at the outboard portions thereof, and means whereby said rolling base is caused to crawl along the length of said truck bed by movement of the driven sprocket means attached thereto and by rolling action of said roller assemblies, wherein said roller assemblies (60) each have a housing means (40) therearound, wherein said truck bed has at least one I-beam (10) running substantially the length of said truck bed, wherein said housing means (40) has lower arms (44, 45) which are arranged in relation to said I-beam for movement along the length of said I-beam, wherein said housing means (40) has first, second and third upper layers thereon, said first layer (41) comprising high strength metal, said second layer (42) comprising an isolation pad, said third layer (43) comprising a high strength metal, wherein said third layer (43) has mounted on the lowerside thereof said housing arm (46), said arms and layers being connected by biasing means, said housing arm (46) having lower arm extensions (44, 45) arranged to interact with an I-beam along the length of the truck bed, wherein said third layer (43) has mounted on the underside thereof roller bearing support means (48), wherein said roller bearing support means (48) have attached thereto a central bearing support means (49), wherein the central bearing support means (49) has mounted thereon a plurality of needle rollers (60), wherein a wear pad (47) is positioned between one of said lower arm's extensions (45) and said I-beam to prevent frictional wear engagement between said extensions and I-beam.

2. The rolling base assembly of claim 1 wherein said truck bed has an upper wooden deck (13, 14), said wooden deck being notched, said chain (20) being mounted within the notch formed in said wooden deck.

3. The assembly of claim 1 wherein said chain (20) is mounted with adjustment means (22,23) at each end whereby said chain can be installed and the tension thereof adjusted.

4. The assembly of claim 1 wherein said rolling base (35) has idler sprockets (31,32) attached thereto and wherein said chain (20) interacts with said idler sprockets and said motor driven sprocket (30).

* * * * *